United States Patent Office 3,470,235
Patented Sept. 30, 1969

3,470,235
ALICYCLIC BISPHENYLENEOXYDICARBOXYLIC ACIDS, SALTS AND ESTERS
Winston J. Jackson, Jr., and John R. Caldwell, Kingsport, Tenn., assignors to Eastman Kodak Company, Rochester, N.Y., a corporation of New Jersey
No Drawing. Continuation-in-part of application Ser. No. 193,593, May 9, 1962, now Patent No. 3,226,362, dated Dec. 28, 1965. This application Nov. 5, 1965, Ser. No. 506,587
Int. Cl. C07c 69/78, 87/02, 65/14
U.S. Cl. 260—473    9 Claims

ABSTRACT OF THE DISCLOSURE

The preparation of alicyclic bridged ring bisphenyleneoxydicarboxylic acids, salts, and esters is disclosed, said compounds being useful in the preparation of high melting, fiber-, and film-forming polyamides.

---

This application is a continuation-in-part of our application Ser. No. 193,593, filed May 9, 1962, entitled "Polyamides From Alicyclic Bisphenyleneoxydicarboxylic Acids," now U.S. Patent No. 3,226,362, granted on Dec. 28, 1965.

This invention relates to the preparation of a new class of alicyclic bridge ring bisphenyleneoxydicarboxylic acids. The preparation of fiber- and film-forming linear polyamides and copolyamides from these acids is disclosed and claimed in the abovementioned parent application.

It is known to produce dicarboxylic acids containing aromatic ether groups of the type represented by the following structural formula:

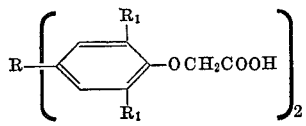

in which R is a straight chain or branched chain aliphatic group such as methylene and isopropylidene and $R_1$ can be alkyl or halogen. The preparation of such acids is described in J. Appl. Chem., 9, 594 (1959). It is also known from this disclosure and from U.S. Patents 2,158,064 and 2,191,556 that fiber-forming polyamides may be produced from such acids by reaction with suitable diamines. However, no high-melting polyamides referred to in these disclosures are readily soluble in low-boiling solvents and the only polyamides which are soluble in volatile solvents have such low melting points as to preclude or at least to limit their use in the preparation of films and textile fibers.

This invention has as one object to prepare a new class of acids which are identified as the alicyclic bridge ring bisphenyleneoxylicarboxylic acids.

These acids can be advantageously used to produce polyamides of the fiber- and film-forming variety which have superior properties over related polymers of the prior art, particularly with respect to solubility in various solvents and with respect to melting point and hardness. These polyamides are soluble in volatile, non-polar solvents such as methylene chloride and chloroform.

Other objects will appear hereinafter.

These objects are accomplished by the following invention, which is illustrated by several preferred embodiments set forth below.

Preparation of the new class of acids of our invention, which are identified as alicyclic bridged ring bis-phenyleneoxydicarboxylic acids, may be carried out in accordance with the following equations:

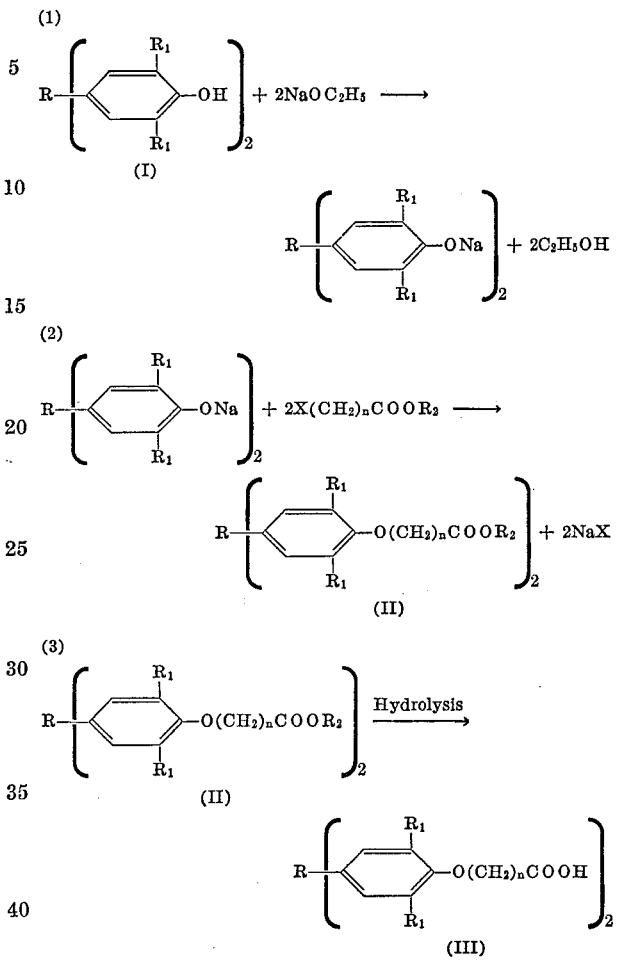

wherein R is a substituent selected from the group of bridged rings consisting of

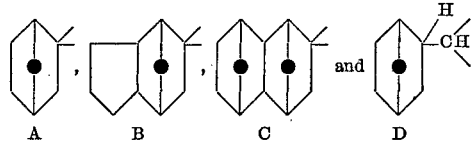

wherein each $R_1$ is a substituent selected from the group consisting of hydrogen, chlorine and straight and branched chain alkyl groups containing from 1 to 4 carbon atoms, $R_2$ is a substituent selected from the group consisting of hydrogen and alkyl groups containing from 1 to 10 carbon atoms, X is a substituent selected from the group consisting of chlorine and bromine and $n$ is 1 to 6.

The above bisphenols (I) and bisphenols containing other alicyclic bridged rings which may be used as the starting materials are described in the application of Caldwell and Jackson entitled Bisphenol Polyesters, Ser. No. 137 980, filed Sept. 14, 1961, now abandoned. Other bisphenols of this class containing various substituents on the alicyclic bridged rings described in said application may also be used, such as 4,4'-(3-methyl-2-norcamphanylmethylene)diphenol, 4,4'-(tricyclo[2.2.1.0$^{2,6}$] heptan-3-ylidene)diphenol and 4,4'-(bicyclo[2.2.2]oct-2-ylidene)bis(2,6-dichlorophenol).

The preparation of aliphatic bisphenyleneoxydicarboxylic acids is described in J. Appl. Chem., 9, 594

(1959). A similar procedure may be used for preparing the alicyclic bisphenyleneoxydicarboxylic acids of this invention. A bisphenol of the structure indicated by (I) above is treated with sodium hydroxide or a sodium alkoxide in a solvent such as water, an alcohol, or dioxane. Suitable sodium alkoxides are sodium methoxide, sodium ethoxide, or sodium butoxide. The disodium salt thus obtained is then treated with an omega-chloro- or bromocarboxylic acid or ester. Purer products are usually obtained when the esters are used instead of their acids. When the product is a diester of the structure illustrated by (II) above, it can be converted to the dicarboxylic acid of the structure indicated by (III) above by a conventional procedure such as acid hydrolysis, alkaline saponification, or ester interchange.

Ester interchange is a convenient and effective method for obtaining the dicarboxylic acid. This is accomplished by refluxing the crude diester (II) in formic or acetic acid in the presence of an acid catalyst such as sulfuric acid or toluene-sulfonic acid. If the $R_2$ group of the ester is methyl or ethyl, the interchange reaction can be followed by distilling off the methyl or ethyl ester (formate or acetate) which is formed.

As indicated above, the acids thus produced are a new class of compounds which have been discovered to be of particular efficacy in the production of high-melting, fiber- and film-forming polyamides as more particularly set forth in the above-mentioned parent application. The distinguishing characteristic of these acids which gives them this particular usefulness is the presence therein of bridged alicyclic rings which, in the formation of the ultimate polymer, contributes a high melting point. Polymers produced from such acids are also characterized by solubility in various non-polar volatile solvents which makes possible the spinning of fibers from solution as well as the casting of films from solution.

In the following examples we have set forth several of the preferred examples of our invention, but they are included merely for purposes of illustration and not as a limitation thereof.

Example 1.—Preparation of [hexahydro-4,7-methanoindan-5-ylidenebis(p-phenyleneoxy)]diacetic acid The above acid is further identified by reference to the following formula:

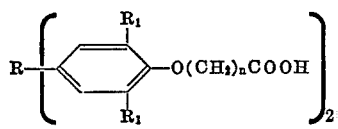

wherein R is the group:

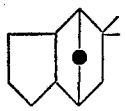

and wherein $R_1$ is hydrogen and $n$ is 1. To a solution of alcoholic sodium ethoxide prepared by dissolving 1.25 moles of sodium in 1 liter of anhydrous ethanol was added 0.50 mole of dry 4,4'-(hexahydro-4,7-methanoindan-5-ylidene)diphenol. After 1.5 moles of ethyl chloroacetate was added to this refluxing solution, the mixture was refluxed while stirring for 16 hours. It was then cooled and filtered from the sodium chloride. After removal of the ethanol, the crude ester was placed in a flask with an equal volume of formic acid and 0.4 ml. of concentrated sulfuric acid. This solution was refluxed, and ethyl formate was periodically removed from the top of a fractionating column attached to the flask. When no more distillate boiling at 55–60° C. was obtained and the temperature in the head remained at 100° C., the ester interchange reaction was completed. The product crystallized as the solution cooled. It was collected and washed with 50 percent acetic acid. It was then treated with decolorizing carbon and recrystallized from aqueous acetic acid. After the dicarboxylic acid was collected, washed, and dried, it melted at 214–217° C. Analysis of the product showed its composition as $C_{26}H_{28}O_6$, which is the correct empirical formula for this compound.

Diamine salts of the above acid have been prepared by adding the alicyclic bisphenyleneoxydicarboxylic acid dissolved in ethanol to a slight excess of the diamine in ethanol. The salts precipitated immediately and were purified by recrystallizating from aqueous ethanol.

Example 2

[2 - norcamphanylidenebis(2,6 - dichloro - p - phenyleneoxy)]-diacetic acid (III), in which R=A, $R_1$=Cl, $n$=1, was prepared by the procedure of Example 1, using 4,4'-(2-norcamphanylidene)bis(2,6-dichlorophenol) as the diphenol. A polyamide was prepared from a salt of this acid and trans-1,4-cyclohexanebis(methylamine) according to the following procedure: The polyamide was prepared by heating 10 grams of the salt of the acid and trans-1,4-cyclohexanebis(methylamine) while stirring in 10 ml. of cresol at 200° C. under nitrogen for 30 minutes. The mixture was then heated at 220° C. for 1 hour and at 240° C. for 3 hours. The cresol distilled off under reduced pressure. Since the polymer became solid when the cresol was removed under reduced pressure at 250° C., it was granulated to pass a 20-mesh screen and then heated at 250° C. under a vacuum of 0.1 mm. for 2 hrs. The polymer had an inherent viscosity of 1.14 and a softening range of 260–275° C., and fibers of good physical properties could be drawn from the viscous melt or dry-spun from chloroform solution.

The acid used in this example was prepared by a procedure similar to that of Example 1. The diethyl ester was prepared first by condensing 4,4'-(2-norcamphanylidene)bis[2,6-dichlorophenol] with ethyl chloroacetate. The procedure of Example 1 was followed, but it was necessary to also add 600 ml. of methanol to the reaction mixture to obtain solution of the bisphenol sodium salt. The diethyl ester, which crystallized from solution, was collected and washed with methanol. After recrystallization from benzene and methanol, it melted at 181–183° C. Analysis of the product showed its composition to be $C_{27}H_{28}Cl_4O_6$, which is the correct empirical formula for this compound. The diester was converted to the dicarboxylic acid by ester interchange with formic acid as in Example 1 but using 1.5 ml. of concentrated sulfuric acid as the catalyst. The product, which crystallized when the solution was cooled, was collected and washed with water. After the product was dried in a vacuum oven at 150° C. to remove solvated water, it melted at 184–186° C. Analysis showed its composition to be $C_{23}H_{20}Cl_4O_6$, which is the correct empirical formula for this compound.

Example 3

[Decahydro - 1,4,5,8 - dimethanonaph) - 2 - ylidenebis-(p-phenyleneoxy)]dihexanoic acid (III, R=C, $R_1$=H, $n$=5) was prepared by the procedure of Example 1, using ethyl 6-bromohexanoate and 4,4'-(decahydro-1,4,5,8-dimethanonaph-2-ylidene)diphenol as the diphenol. The analysis of the dicarboxylic acid of Example 3 showed its composition to be $C_{36}H_{46}O_6$, which is the correct empirical formula for this compound. A polyamide was prepared from the salt of this acid and 1,4-cyclohexanediamine according to the method of Example 2. The polymer had an inherent viscosity of 0.59 and a softening range of 230–245° C. and could be employed to produce fibers of good physical properties.

Example 4

[2 - norcamphanylmethylenebis(p - phenyleneoxy)]diacetic acid (III, R=D, $R_1$=H, n=1) was prepared by the procedure of Example 1, using 4,4'-(2-norcamphanylmethylene)diphenol as the diphenol. The analysis of the dicarboxylic acid of Example 4 showed its composition to be $C_{24}H_{26}O_6$, which is the correct empirical formula for this compound. A polyamide was prepared from the salt of this acid and p-xylylene-α,α'-diamine according to a procedure similar to that of Example 2. The polymer had an inherent viscosity of 0.66 and a softening range of 210–230° C.

Example 5

[2 - Norcamphanylidenebis(p - phenyleneoxy)]diacetic acid was prepared by a procedure similar to that of Example 1. The diethyl ester, obtained by condensing 4,4'-(2-norcamphanylidene)diphenol with ethyl chloroacetate, consisted of a viscous sirup with a saponification equivalent of 226 (theoretical is 223). This diester was converted to the dicarboxylic acid by ester interchange with formic acid as in Example 1 but using 1.5 ml. of concentrated sulfuric acid as the catalyst. Removal of the formic acid by distillation under reduced pressure yielded a very viscous sirup. This was dissolved in aqueous potassium hydroxide and slowly poured into concentrated hydrochloric acid. When the precipitated product, a gum, was then triturated in concentrated hydrochloric acid, it solidified. This was collected and dried in a vacuum desiccator. The dicarboxylic acid was a hygroscopic, glassy material with a neutral equivalent of 200 (theoretical is 198). The diamide derivative melted at 110–112° C.

*Analysis.*—Calculated for $C_{23}H_{26}N_2O_4$: N, 7.1. Found: N, 6.9.

By following the procedures of the above examples other novel acids, salts, esters, and the like may be prepared from the alicyclic bridged ring bisphenyleneoxydicarboxylic acids of the invention and any of these acids or salts of the mentioned diamines can be employed to prepare polyamides. Other acids or salts thereof that are suitable for replacing part of the alicyclic bridged ring bisphenyleneoxydicarboxylic acids may also be used in part for preparing polyamides. The products have generally similar properties to those mentioned in the above examples. Even though the polymers are high-melting, they are soluble in volatile, non-polar solvents such as methylene chloride and chloroform or mixtures of these solvents with alcohols, which solutions can be wet-spun or dry-spun into strong fibers or coated into clear, flexible sheets and films. The latter products are useful among other things as photographic film supports or as a subbing base when attached to other films for photographic applications. Since the polyamides are hard materials, they are valuable as protective coatings on shaped objects of metal, glass, wood, and other materials. The polymers are thermoplastic and shaped objects can be obtained by injection-molding, fibers can be obtained by melt-spinning, and films and sheets by extrusion. If desired, various fillers, pigments, dyes, lubricants, plasticizers, etc., can be incorporated into the polyamide products.

As is readily apparent from the above examples, this invention provides a process for preparing novel salts and esters of the novel acids. In Examples 1–5 the sodium salts and ethyl esters are disclosed. Example 1 discloses the diamine salts in general. In Examples 2 and 3 the salts of trans-1,4-cyclohexanebis(methylamine) and 1,4-cyclohexanediamine are also disclosed. In Example 4 the salt of p-xylylene-α,α'-diamine is disclosed. Thus, these examples specifically describe and illustrate alkali metal salts, esters of lower aliphatic alcohols (1–8 carbons) and salts of bifunctional diamines having two amino radicals attached to a bivalent hydrocarbon radical containing from 2 to 20 carbon atoms. Of course, other equivalent salts and esters are also contemplated as being within the obvious scope of the invention. All of these compounds are useful as intermediates in the preparation of polymers such as the polyamides mentioned more particularly in this specification.

Thus, it is an additional odject of this invention to provide new and useful salts and esters of the novel acids described in this specification.

Although the invention has been described in considerable detail with particular reference to certain preferred embodiments thereof, variations and modifications can be effected within the spirit and scope of the invention as described hereinabove and as defined in the appended claims.

We claim:

1. An alicyclic bridged ring bisphenyleneoxydicarboxylic acid having the structural formula:

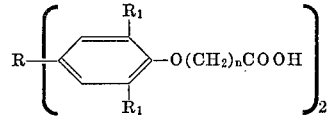

wherein R is selected from the group of radicals consisting of

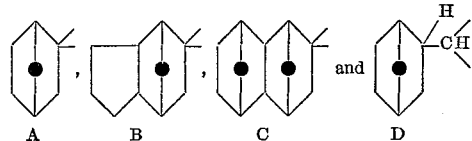

and wherein each $R_1$ is a substituent selected from the group consisting of hydrogen, chlorine and straight and branched-chain alkyl groups containing from 1 to 4 carbon atoms and $n$ is 1 to 6.

2. [Hexahydro - 4,7 - methanoindan - 5 - ylidenebis(p - phenyleneoxy)]diacetic acid, being a species of the acids of claim 1.

3. [2 - norcamphanylidenebis(2,6 - dichloro-p-phenyleneoxy)]diacetic acid, being a species of the acids of claim 1.

4. [Decahydro - 1,4,5,8 - dimethanonaph - 2 - ylidenebis(p - phenyleneoxy)]dihexanoic acid, being a species of claim 1.

5. [2 - norcamphanylmethylenebis(p - phenyleneoxy)] diacetic acid, being a species of the acids of claim 1.

6. [2 - norcamphanylidenebis(p - phenyleneoxy)] diacetic acid, being a species of the acids of claim 1.

7. An alkali metal salt of the acids of claim 1.

8. A lower alkyl ester of the acids of claim 1.

9. A diamine salt of the acids of claim 1 wherein the diamine has two amino radicals attached to a divalent hydrocarbon radical.

References Cited

UNITED STATES PATENTS 3,193,576   7/1965   Richter _____ 260—520

LORRAINE A. WEINBERGER, Primary Examiner

D. STENZEL, Assistant Examiner

U.S. Cl. X.R.

260—501.2, 520